(12) United States Patent
Kleiman

(10) Patent No.: US 6,915,447 B2
(45) Date of Patent: *Jul. 5, 2005

(54) FILE SERVER STORAGE ARRANGEMENT

(75) Inventor: Steven Kleiman, Los Altos, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 685 days.

This patent is subject to a terminal disclaimer.

(21) Appl. No.: 09/960,592

(22) Filed: Sep. 21, 2001

(65) Prior Publication Data

US 2002/0007470 A1 Jan. 17, 2002

Related U.S. Application Data

(63) Continuation of application No. 09/037,652, filed on Mar. 10, 1998, now Pat. No. 6,317,844.

(51) Int. Cl.[7] .................................................. G06F 11/00
(52) U.S. Cl. .............................................. 714/6; 714/5
(58) Field of Search ........................ 714/6, 4–5, 7–13, 714/42, 47; 711/114; 709/213, 216–219

(56) References Cited

U.S. PATENT DOCUMENTS

| | | | |
|---|---|---|---|
| 5,008,786 A | 4/1991 | Thatte | |
| 5,633,999 A | 5/1997 | Clowes et al. | |
| 5,649,196 A | 7/1997 | Woodhill et al. | |
| 5,721,916 A | 2/1998 | Pardikar | |
| 5,819,020 A | * 10/1998 | Beeler, Jr. | 714/5 |
| 5,996,086 A | 11/1999 | Delaney et al. | |
| 6,119,244 A | 9/2000 | Schoenthal et al. | |
| 6,163,853 A | 12/2000 | Findlay et al. | |
| 6,192,389 B1 | * 2/2001 | Ault et al. | 718/101 |

* cited by examiner

*Primary Examiner*—Dieu-Minh Le
(74) *Attorney, Agent, or Firm*—Swernofsky Law Group PC

(57) ABSTRACT

The invention provides a storage system that is highly available even in the face of component failures in the storage system, and a method for operating that storage system. A first and a second file server each includes a file server request log for storing incoming file server requests. Both the first and second file servers have access to a common set of mass storage elements. Each incoming file server request is copied to both the first and second file servers; the first file server processes the file server request while the second file server maintains a copy in its file server request log. Each file server operates using a file system that maintains consistent state after each file server request. On failover, the second file server can perform those file server requests in its file server request log since the most recent consistent state. There is no single point of failure that prevents access to any individual mass storage element.

34 Claims, 3 Drawing Sheets

FILE SERVER STORAGE ARRANGEMENT

This application is a continuation of application Ser. No. 09/037,652 filed Mar. 10, 1998, now U.S. Pat. No. 6,317,844.

BACKGROUND OF THE INVENTION

1. Field of the Invention

The invention relates to storage systems.

2. Related Art

Computer storage systems are used to record and retrieve data. In some computer systems, storage systems communicate with a set of client devices, and provide services for recording and retrieving data to those client devices. Because data storage is important to many applications, it is desirable for the services and data provided by the storage system to be available for service to the greatest degree possible. It is therefore desirable to provide storage systems that can remain available for service even in the face of component failures in the storage system.

One known technique for providing storage systems that can remain available for service is to provide a plurality of redundant storage elements, with the property that when a first storage element fails, a second storage element is available to provide the services and the data otherwise provided by the first. Transfer of the function of providing services from the first to the second storage element is called "failover." The second storage element maintains a copy of the data maintained by the first, so that failover can proceed without substantial interruption.

A first known technique for achieving failover is to cause the second storage element to copy all the operations of the first. Thus, each storage operation completed by the first storage element is also completed by the second. This first known technique is subject to drawbacks: (1) It uses a substantial amount of processing power at the second storage element duplicating efforts of the first, most of which is wasted. (2) It slows the first storage element in confirming completion of operations, because the first storage element waits for the second to also complete the same operations.

A second known technique for achieving failover is to identify a sequence of checkpoints at which the first storage element is at a consistent and known state. On failover, the second storage element can continue operation from the most recent checkpoint. For example, the NFS (Network File System) protocol requires all write operations to be stored to disk before they are confirmed, so that confirmation of a write operation indicates a stable file system configuration. This second known technique is subject to drawbacks: (1) It slows the first storage element in performing write operations, because the first storage element waits for write operations to be completely stored to disk. (2) It slows recovery on failover, because the second storage element addresses any inconsistencies left by failure of the first between identified checkpoints.

Accordingly, it would be advantageous to provide a storage system, and a method for operating a storage system, that efficiently uses all storage system elements, quickly completes and confirms operations, and quickly recovers from failure of any storage element. This advantage is achieved in an embodiment of the invention in which the storage system implements frequent and rapid checkpoints, and in which the storage system rapidly distributes duplicate commands for those operations between checkpoints among its storage elements.

SUMMARY OF THE INVENTION

The invention provides a storage system that is highly available even in the face of component failures in the storage system, and a method for operating that storage system. A first and a second file server each includes a file server request log for storing incoming file server requests. Both the first and second file servers have access to a common set of mass storage elements. Each incoming file server request is copied to both the first and second file servers; the first file server processes the file server request while the second file server maintains a copy in its file server request log. Each file server operates using a file system that maintains consistent state after each file server request. On failover, the second file server can perform those file server requests in its file server request log since the most recent consistent state.

In a second aspect of the invention, a file server system provides mirroring of one or more mass storage elements. Each incoming file server request is copied to both the first file server and the second file server. The first file server performs the file server requests to modify a primary set of mass storage elements, and also performs the same file server requests to modify a mirror set of mass storage elements. The mirror mass storage elements are disposed physically separately from the primary mass storage elements, such as at another site, and provide a resource in the event the entire primary set of mass storage elements is to be recovered.

DETAILED DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using one or more general purpose processors (or special purpose processors adapted to the particular process steps and data structures) operating under program control, and that implementation of the preferred process steps and data structures described herein using such equipment would not require undue experimentation or further invention.

File Server Pair and Failover Operation

Figure 1:
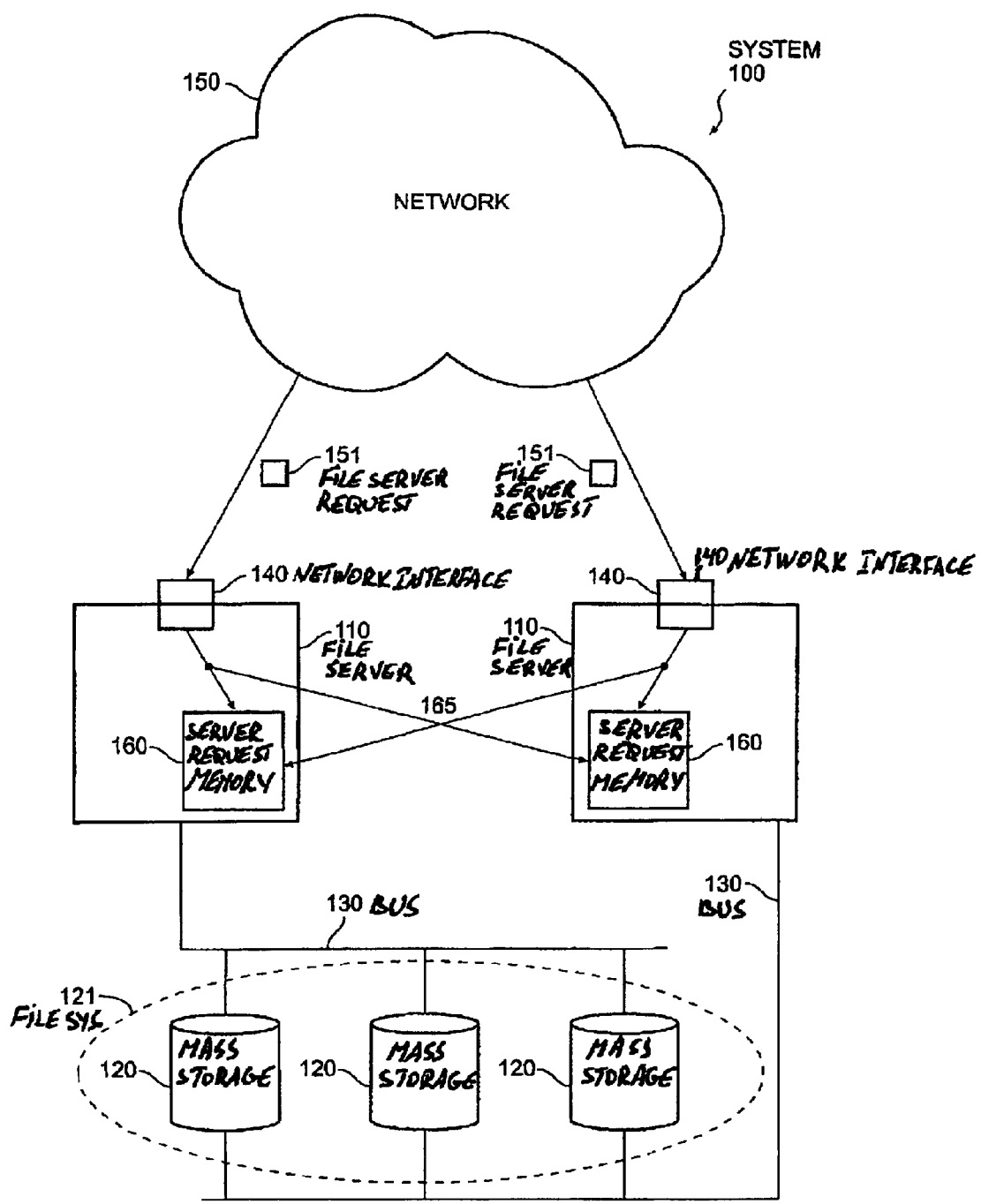
FIG. 1 shows a block diagram of a highly available file server system.

FIG. 1 shows a block diagram of a highly available file server system.

A file server system 100 includes a pair of file servers 110, both coupled to a common set of mass storage devices 120. A first one of the file servers 110 is coupled to a first I/O bus 130 for controlling a first selected subset of the mass storage devices 120. Similarly, a second one of the file servers 110 is coupled to a second I/O bus 130 for controlling a second selected subset of the mass storage devices 120.

Although both file servers 110 are coupled to all of the common mass storage devices 120, only one file server 110 operates to control any one mass storage device 120 at any designated time. Thus, even though the mass storage devices 120 are each controllable by only one file server 110 at a time, each of the mass storage devices 120 remains available even if one of its two associated file servers 110 fails.

In a preferred embodiment, the file server system 100 includes a pair of such file servers 110; however, in alternative embodiments, more than two such file servers 110 may be included in a single file server system 100.

In a preferred embodiment, the first I/O bus 130 and the second I/O bus 130 each include a mezzanine bus such as the PCI bus architecture.

In a preferred embodiment, the mass storage devices 120 include magnetic disk drives, optical disk drives, or magneto-optical disk drives. In alternative embodiments, however, other storage systems may be used, such as bubble memory, flash memory, or systems using other storage technologies. Components of the mass storage devices 120 are referred to as "disks," even though those components may comprise other forms or shapes.

Each mass storage device 120 can include a single disk or a plurality of disks. In a preferred embodiment, each mass storage device 120 includes a plurality of disks and is disposed and operated as a RAID (Redundant Array of Inexpensive Disks) storage system.

In a preferred embodiment, the first file server 110 is coupled to the second file server 110 using a common interconnect. The common interconnect provides a remote memory access capability for each file server 110, so that data can be stored at each file server 110 from a remote location. In a preferred embodiment, the common interconnect includes a Tandem "ServerNet" interconnect. The common interconnect is coupled to each file server 110 using a device controller coupled to an I/O bus for each file server 110.

The first file server 110 is coupled to a first network interface 140, which is disposed to receive file server requests 151 from a network 150. Similarly, the second file server 110 is coupled to a second network interface 140, which is also disposed to receive file server requests 151 from the network 150.

The first file server 110 includes a first server request memory 160 (also referred to as a file server change memory herein), which receives the file server requests 151 and records them. In the event the first file server 110 recovers from a power failure or other service disruption, the outstanding file server requests 151 in the first server request memory 160 are re-performed to incorporate them into a next consistent state of the file system maintained by the first file server 110.

Similarly, the second file server 110 includes a second server request memory 160 (also referred to as a file server change memory herein), which receives the file server requests 151 and records them. In the event the second file server 110 recovers from a power failure or other service disruption, the outstanding file server requests 151 in the second server request memory 160 are re-performed to incorporate them into a next consistent state of the file system maintained by the second file server 110.

When the first file server 110 receives a file server request 151 from the network 150, that file server request 151 is copied into the first server request memory 160. The file server request 151 is also copied into the second server request memory 160 using remote memory access over the common interconnect. Similarly, when the second file server 110 receives a file server request 151 from the network 150, that file server request 151 is copied into the second server request memory 160. The file server request 151 is also copied into the first server request memory 160 using remote memory access over the common interconnect. Using remote memory access is relatively quicker and has less communication overhead than using a networking protocol.

In the event that either file server 110 fails, the other file server 110 can continue processing using the file server requests 151 stored in its own server request memory 160.

In a preferred embodiment, each server request memory 160 includes a nonvolatile memory, so those file server requests stored in either server request memory 160 are not lost due to power failures or other service interruptions.

The first and second file servers 110 and their respective server request (change) memories 160 communicate via interconnection(s) 165, which in one embodiment of the invention are implemented in a NUMA (Non-Uniform Memory Access) interconnection network.

The responding file server 110 processes the file server request 151 and possibly modifies stored files on one of the mass storage devices 120. The non-responding file server 110, partner to the responding file server 110, maintains the file server request 151 stored in its server request memory 160 to prepare for the possibility that the responding file server 110 might fail. In the event the responding file server 110 fails, the non-responding file server 110 processes the file server request 151 as part of a failover technique.

In a preferred embodiment, each file server 110 controls its associated mass storage devices 120 so as to form a redundant array, such as a RAID storage system, using inventions described in the following patent applications:

U.S. Pat. No. 5,948,110, issued Sept. 7, 1999, on application Ser. No. 08/471,218, filed Jun. 5, 1995, in the name of inventors David Hitz et al., titled "A Method for Providing Parity in a Raid Sub-System Using Non-Volatile Memory";

U.S. Pat. No. 5,819,292, issued Oct. 6, 1998, on application Ser. No. 08/454,921, filed May 31, 1995, in the name of inventors David Hitz et al., titled "Write Anywhere File-System Layout";

U.S. Pat. No. 6,038,570, issued Mar. 14, 2000, on application Ser. No. 08/464,591, filed May 31, 1995, in the name of inventors David Hitz et al., titled "Method for Allocating Files in a File System Integrated with a Raid Disk Sub-System".

Each of these applications is hereby incorporated by reference as if fully set forth herein. They are collectively referred to as the "WAFL (Write Anywhere File system Layout) Disclosures."

As part of the techniques shown in the WAFL Disclosures, each file server 110 controls its associated mass storage devices 120 in response to file server requests 151 in an atomic manner. The final action for any file server request 151 is to incorporate the most recent consistent state into the file system 121. Thus, file system 121 is in an internally consistent state after completion of each file server request 151. Thus, a file system 121 defined over the mass storage devices 120 will be found in an internally consistent state, regardless of which file server 110 controls those mass storage devices 120. Exceptions to the internally consistent state will only include a few of the most recent file server requests 151, which will still be stored in the server request memory 160 for both file servers 110. Those most recent file server requests 151 can be incorporated into a consistent state by performing them with regard to the most recent consistent state.

For any file server request 151, in the event the file server 110 normally responding to that file server request 151 fails, the other file server 110 will recognize the failure and perform a failover method to take control of mass storage devices 120 previously assigned to the failing file server 110.

The failover file server 110 will find those mass storage devices 120 with their file system 121 in an internally consistent state, but with the few most recent file server requests 151 as yet unperformed. The failover file server 110 will have copies of these most recent file server requests 151 in its server request memory 160, and will perform these file server requests 151 in response to those copies.

File Server Node

Figure 2:
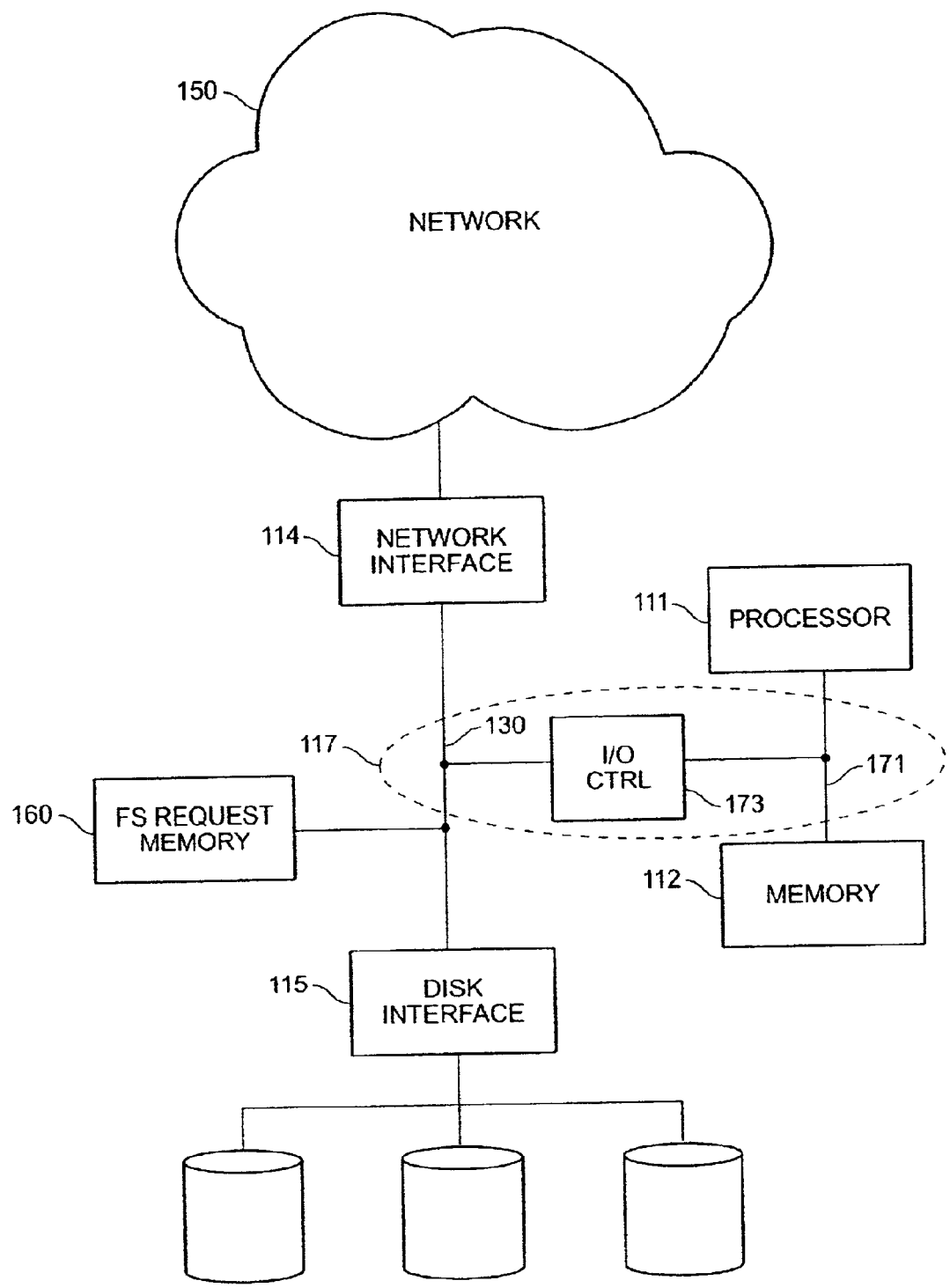
FIG. 2 shows a block diagram of a file server in the file server system.

FIG. 2 shows a block diagram of a file server in the file server system.

Each file server 110 includes at least one processor 111, a program and data memory 112, the server request memory 160 (including a nonvolatile RAM), a network interface element 114, and a disk interface element 115. These elements are interconnected using a bus 117 or other known system architecture for communication among processors, memory, and peripherals.

In a preferred embodiment, the network interface element 114 includes a known network interface for operating with the network 150. For example, the network interface element 114 can include an interface for operating with the FDDI interface standard or the 100BaseT interface standard.

After failover, the file server 110 responds to file server requests directed to either itself or its (failed) partner file server 110. Each file server 110 is therefore capable of assuming an additional network identity on fail over, one for itself and one for its failed partner file server 110. In a preferred embodiment, the network interface element 114 for each file server 110 includes a network adapter capable of responding to two separate addresses upon instruction by the file server 110. In an alternative embodiment, each file server 110 may have two such network adapters.

In a preferred embodiment, the disk interface element 115 includes a known disk interface for operating with magnetic, optical, or magneto-optical disks, that has two independent ports with each port coupled to a separate file server 110, such as the FC-AL interface. This helps prevent failure of one file server 110 from affecting low-level operation of the other file server 110.

In a preferred embodiment, the bus 117 includes at least a memory bus 171 and the mezzanine bus 130. The memory bus 171 couples the processor 111 and the program and data memory 112. The mezzanine bus 130 couples the network interface element 114 and the disk interface element 115. The memory bus 171 is coupled to the mezzanine bus 130 using an I/O controller 173 or other known bus adapter technique.

In a preferred embodiment, each disk in the mass storage 120 is statically assigned to either the first file server 110 or the second file server 110, responsive to whether the disk is wired for primary control by either the first file server 110 or the second file server 110. Each disk has two control ports A and B; the file server 110 wired to port A has primary control of that disk, while the other file server 110 only has control of that disk when the other file server 110 has failed.

Operation Process Flow

Figure 3:
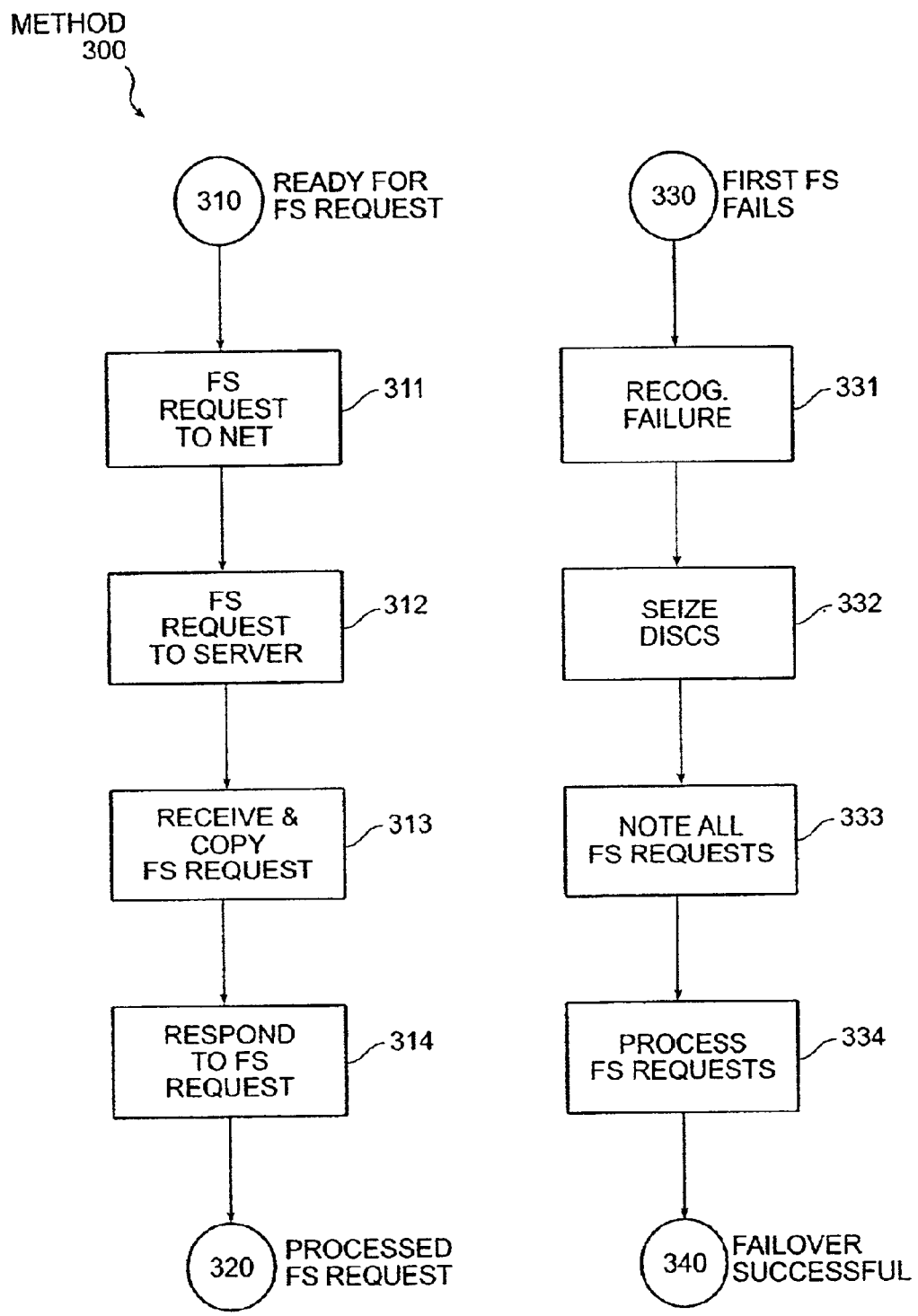
FIG. 3 shows a process flow diagram of operation of the file server system.

FIG. 3 shows a process flow diagram of operation of the file server system.

A method 300 is performed by the components of the file server 100, and includes a set of flow points and process steps as described herein.

At a flow point 310, a device coupled to the network 150 desires to make a file system request 151.

At a step 311, the device transmits the file system request 151 to the network 150.

At a step 312, the network 150 transmits the file server request 151 to the file server 110.

At a step 313, a first file server 110 at the file server system 100 receives the file server request 151. The first file server 110 copies the file server request 151 into the first server request memory 160, and also copies the file server request 151 into the second server request memory 160 using the common interconnect. The target of the copying operation in the second server request memory 160 is to an area reserved for this purpose. The copying operation requires no further processing by the second file server 110, and the second file server 110 does not normally process or respond to the file server request 151.

At a step 314, the first file server 110 responds to the file server request 151.

At a flow point 320, the file server request has been successfully processed.

In a second aspect of the invention, the first file server 110 provides mirroring of one or more of its mass storage devices 120.

As with the first aspect of the invention, each incoming file server request is copied to both the first file server 110 and the second file server 110. The first file server 110 performs the file server requests to modify one or more primary mass storage devices 120 under its control. The first file server 110 also performs the file server requests to modify a set of mirror mass storage devices 120 under its control, but located distant from the primary mass storage devices 120. Thus, the mirror mass storage devices 120 will be a substantial copy of the primary mass storage devices 120.

The mirror set of mass storage devices 120 provide a resource in the event the entire primary set of mass storage devices 120 is to be recovered, such as if a disaster befalls the primary set of mass storage devices 120.

At a flow point 330, the first file server 110 in the file server system 100 fails.

At a step 331, the second file server 110 in the file server system 100 recognizes the failure of the first file server 110.

In a preferred embodiment, the second file server 110 performs the step 331 in the following manner:

Each file server 110 maintains two disks of its mass storage devices 120 (thus, there are a total of four such disks for two file servers 110) for recording state information about the file server 110. There are two such disks (called "mailbox disks") so that one can be used as primary storage and one can be used as backup storage. If one of the two mailbox disks fails, the file server 110 using that mailbox disk designates another disk as one of its two mailbox disks.

Each file server 110 maintains at least one sector on each mailbox disk, on which the file server 110 periodically writes state information. Each file server 110 also sends its state information to the other file server 110 using the interconnect using remote memory access. The state information written to the mailbox disks by each file server 110 changes with each update.

Each file server 110 periodically reads the state information from at least one of the mailbox disks for the other file server 110. Each file server 110 also receives state information from the other file server 110 using the interconnect using remote memory access.

Each file server 110 recognizes if the other file server 110 has failed by noting that there has been no update to the state information on the mailbox disks for the other file server 110.

In a preferred embodiment, the second file server 110 determines whether failure of the first file server 110 is a hardware error or a software error, and only recognizes failure of the first file server 110 for hardware errors. In alternative embodiments, the second file server 110 may recognize failure of the first file server 110 for software errors as well.

At a step 332, the second file server 110 seizes control of all mass storage devices 120 previously assigned to the first file server 110. Due to the nature of the techniques shown in the WAFL Disclosures, the file system 121 defined over those mass storage devices 120 will be in an internally consistent state. All those file server requests 151 marked completed will have been processed and the results incorporated into storage blocks of the mass storage devices 120.

In normal operation, neither file server 110 places reservations on any of the mass storage devices 120. In the step 332 (only on failover), the second file server 110 seizes control of the mass storage devices 120 previously controlled by the first file server 110, and retains control of those mass storage devices 120 until it is satisfied that the first file server 110 has recovered.

When the first file server 110 recovers, it sends a recovery message to the second file server 110. In a preferred embodiment, the second file server 110 relinquishes control of the seized mass storage devices 120 by operator command. However, in alternative embodiments, the second file server 110 may recognize the recovery message from the first file server 110 and relinquish control of the seized mass storage devices 120 in response thereto.

At a step 333, the second file server 110 notes all file server requests 151 in the area of its server request memory 160 that were copied there by the first file server 110. Those file server requests 151 whose results were already incorporated into storage blocks of the storage devices 120 are discarded.

At a step 334, when the second file server 110 reaches its copy of each file server request 151, the second file server 110 processes the file server request 151 normally.

At a flow point 340, failover from the first file server 110 to the second file server 110 has been successfully handled.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A computer-readable memory storing information including instructions, the instructions executable by at least one processor to operate a file system, the instructions, when executed by the at least one processor, causing the at least one processor to perform steps comprising:

responding to an incoming file server request by copying a descriptor of a file system change to both a first file server and a second file server;

processing said file system change at said first file server while maintaining said descriptor copy at said second file server; and performing, at said second file server, a file system change in response to a copied descriptor and a service interruption by said first file server.

2. A memory as in claim 1, wherein the instructions, when executed by the at least one processor, further cause the at least one processor to perform steps of associating said first file server and said second file server with a mass storage element.

3. A memory as in claim 2, wherein the instructions, when executed by the at least one processor, further cause the at least one processor to perform steps of delaying output by at least one said file server to said mass storage element without delaying a response to file system changes.

4. A memory as in claim 1, wherein said first file server is disposed for processing said file system changes atomically, whereby said second file server can on failover process exactly those file system changes not already processed by said first file server.

5. A memory as in claim 2, wherein said mass storage element includes a file storage system and each said file server is disposed for leaving said file storage system in an internally consistent state after processing each said file system change.

6. A memory as in claim 2, wherein said steps of performing a file system change in response to a copied descriptor are also operative in response to a service interruption by said second file server.

7. A memory as in claim 1, wherein said first file server is disposed to respond identically to service interruptions for itself and for said second file server.

8. A memory as in claim 1, wherein at least one said file server responds to said file system change before committing a result of said file system change to mass storage.

9. A memory as in claim 1, wherein each said file server includes a file server change memory;

each one of said file servers is coupled to at least a portion of said file server change memory included in the other one of said file servers using local memory access; and each one of said file servers is coupled to at least a portion of said file server change memory included in the other one of said file servers using remote memory access.

10. A memory as in claim 9, wherein said file server change memory includes a disk block.

11. A memory as in claim 9, wherein said file server change memory includes a file server request.

12. A memory as in claim 9, wherein said file server change memory is disposed to delay output to a mass storage element without delaying a response to file server requests.

13. A memory as in claim 1, wherein said step of processing includes steps of processing said file system change at both a primary mass storage element and a mirror mass storage element.

14. A computer-readable memory storing information including instructions, the instructions executable by at least one processor to operate a file system, the instructions, when executed by the at least one processor, causing the at least one processor to perform steps comprising:

receiving a file server request at one of a plurality of file servers and in response thereto copying a descriptor of a file system change into a server change memory;

processing said file system change for both a first set of mass storage devices coupled to a first one of said file servers and for at least one mass storage device in a second set of mass storage devices coupled to a second one of said file servers.

15. A memory as in claim 14, wherein said descriptor includes a file server request.

16. A memory as in claim 14, wherein said server change memory includes a disk block.

17. A memory as in claim 14, wherein said server change memory includes a file server request.

18. A memory as in claim 14, wherein said server change memory includes a first portion disposed at said first file server and a second portion disposed at said second file server.

19. A memory as in claim 14, wherein said server change memory includes a first portion disposed at said first file server and a second portion disposed at said second file server; and wherein said steps of copying include steps of copying said descriptor into both said first portion and said second portion.

20. A memory as in claim 14, wherein said server change memory includes a first portion disposed at said first file server and a second portion disposed at said second file server; and said steps of copying include steps of copying said descriptor into both said first portion and said second portion by either of said first file server or said second file server.

21. A memory as in claim 14, wherein said server change memory is disposed to delay output to said at least one mass storage device without delaying a response to file server requests.

22. A memory as in claim 14, wherein
said steps of receiving include receiving a file server request at either said first file server or said second file server, and said steps of copying said descriptor include copying by either said first file server or said second file server; and wherein the instructions, when executed by the at least one processor, further cause the at least one processor to perform step of
processing said file system change for both said second set of mass storage devices and for at least one mass storage device in said first set.

23. A computer-readable memory storing information including instructions, the instructions executable by at least one processor to operate a file system, the instructions, when executed by the at least one processor, causing the at least one processor to perform steps comprising:
receiving a file server request at one of a plurality of file servers and in response thereto copying a descriptor of a file system change into a file server change memory; and
responding to a service interruption by performing a file system change in response to a descriptor in said file server change memory.

24. A memory as in claim 23, wherein the instructions, when executed by the at least one processor, further cause the at least one processor to perform steps of associating said plurality of file servers with at least one mass storage element and at least one file server change memory.

25. A memory as in claim 24, wherein the instructions, when executed by the at least one processor, further cause the at least one processor to perform steps of leaving a file storage system on said mass storage element in an internally consistent state after processing each said file system change.

26. A memory as in claim 24, wherein the instructions, when executed by the at least one processor, further cause the at least one processor to perform steps of:
leaving a file storage system on said mass storage element in an internally consistent state after processing file system changes;
associating said internally consistent state with a set of completed file system changes; and
identifying said set of completed file system changes by at least one said file server.

27. A memory as in claim 23, wherein the instructions, when executed by the at least one processor, further cause the at least one processor to perform steps of delaying output to a mass storage element without delaying a response to file server requests.

28. A memory as in claim 23, the instructions, when executed by the at least one processor, further cause the at least one processor to perform steps of performing said received file server request at both a primary mass storage element and a mirror mass storage element.

29. A memory as in claim 23, wherein the instructions, when executed by the at least one processor, further cause the at least one processor to perform steps of:
processing said file system changes atomically at a first said file server; and
on failover processing exactly those file system changes not already processed by said first file server.

30. A memory as in claim 23, wherein the instructions, when executed by the at least one processor, further cause the at least one processor to perform steps of responding identically at a first said file server to service interruptions for itself and for a second said file server.

31. A memory as in claim 23, wherein said file server change memory includes a disk block.

32. A memory as in claim 23, wherein said file server change memory includes a file server request.

33. A memory as in claim 23, wherein said file server change memory is disposed to delay output to a mass storage element without delaying a response to file server requests.

34. A memory as in claim 23, wherein the instructions, when executed by the at least one processor, further cause the at least one processor to perform steps of responding to a file system change before committing a result of said file system change to mass storage at one of said file servers.

* * * * *